United States Patent [19]

Pope

[11] Patent Number: 5,480,582
[45] Date of Patent: Jan. 2, 1996

[54] PROCESS FOR SYNTHESIZING AMORPHOUS SILICA MICROSPHERES WITH FLUORESCENCE BEHAVIOR

[76] Inventor: Edward J. A. Pope, 447 Lorenzo Dr., Agoura, Calif. 91301

[21] Appl. No.: 84,876

[22] Filed: Jun. 30, 1993

[51] Int. Cl.⁶ .................................................. C04B 35/624
[52] U.S. Cl. ..................... 252/301.4 F; 501/12; 423/338
[58] Field of Search ...................................... 423/338, 339; 252/301.4 F; 501/33, 12

[56] References Cited

U.S. PATENT DOCUMENTS

| | | | |
|---|---|---|---|
| 3,857,924 | 12/1974 | Halasz et al. | 423/339 |
| 4,564,556 | 1/1986 | Lange | 501/33 |
| 4,931,312 | 6/1990 | Leeuw et al. | 427/64 |
| 4,948,843 | 8/1990 | Roberts et al. | 525/328.2 |
| 4,965,091 | 10/1990 | Fratello et al. | 427/64 |
| 5,200,334 | 4/1993 | Dunn et al. | 501/12 |
| 5,206,189 | 4/1993 | Caldwell | 423/339 |
| 5,207,814 | 5/1993 | Cogliati et al. | 501/12 |
| 5,256,386 | 10/1993 | Nystrom et al. | 423/339 |
| 5,292,801 | 3/1994 | Avnir et al. | 501/12 |

FOREIGN PATENT DOCUMENTS 1-264924  10/1989  Japan ..................................... 423/338

*Primary Examiner*—Mark L. Bell
*Assistant Examiner*—C. M. Bonner
*Attorney, Agent, or Firm*—W. Edward Johansen

[57] ABSTRACT

A process for synthesizing amorphous silica microspheres having fluorescence behavior includes the steps of placing into a container an organosilicon precursor and with a highly acidic solution and rinsing with a solvate to remove excess of the organosilicon precursor from the amorphous silica microspheres. The organosilicon precursor and the highly acidic solution are immiscible. The process for synthesizing amorphous silica microspheres also includes the steps adding a dopant from a group consisting of rhodamine-6G, rhodamine-B, europium $3^+$, fluorescein, coumarin-120, coumarin-314T, thionine, uranium and uranium-sensitized europium, stirring the organosilicon precursor and the highly acidic solution to form droplets of the organosilicon precursor in the highly acidic solution whereby water in the highly acidic solution hydrolizes the droplets of the organosilicon precursor to form amorphous silica microspheres and rinsing with a solvant to remove excess of the organosilicon precursor therefrom.

2 Claims, 4 Drawing Sheets

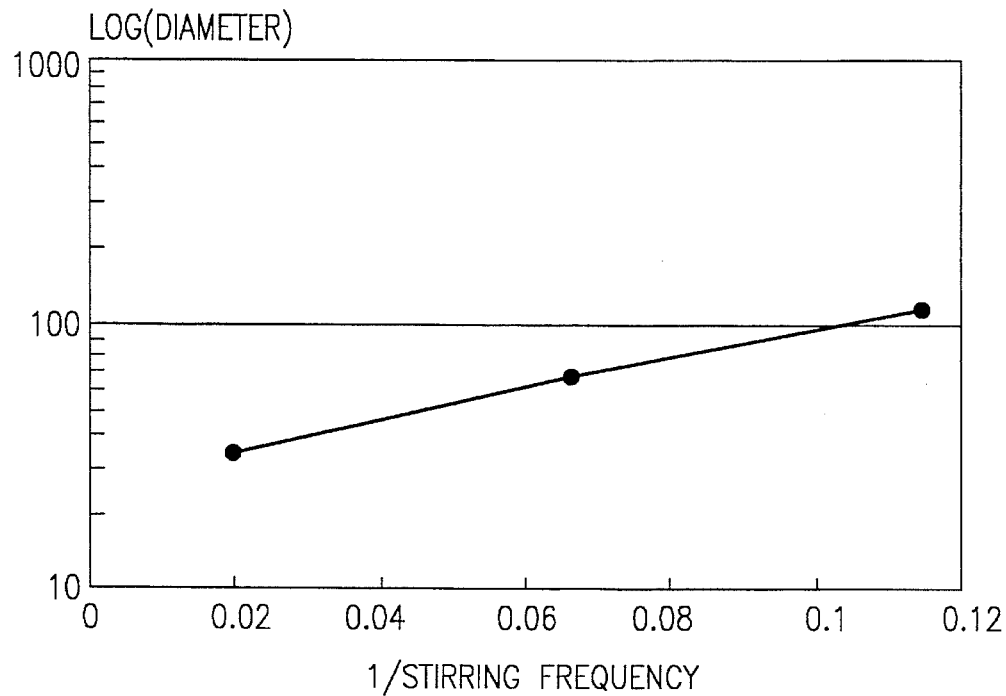

FIG. 2

TABLE 1: EFFECT OF LIQUID ENVIRONMENT ON THE FLUORESCENCE BEHAVIOR OF OPTICALLY ACTIVE SILICA-GEL MICROSPHERES

| | FLUORESCENCE PEAK WAVELENGTH (nm) | | |
|---|---|---|---|
| DOPANT IN MICROSPHERE | RHODAMINE-6G | RHODAMINE-B | EUROPIUM 3+ |
| DYE IN EtOH SOL'N | 561 | 576 | N/A |
| DRIED MICROSOHERE | 586 | 642 | 615 |
| IMMERSED IN EtOH (30 MINUTES) | 579 | 628 | 615 |
| 24 HOURS) | 574 | 625 | 615 |
| IMMERSED IN HCL SOL'N (30 MINUTES) | 585 | 604 | 616 |
| (24 HOURS) | 580 | 603 | 616 |
| IMMERSED IN NH$_4$OH SOL'N (30 MINUTES) | 594 | 599* | 615 |
| (24 HOURS | 589 | 596* | 616 |

* SIGNIFICANT LEACHING OF DYE FROM MICROSPHERES OBSERVED.

FIG. 4

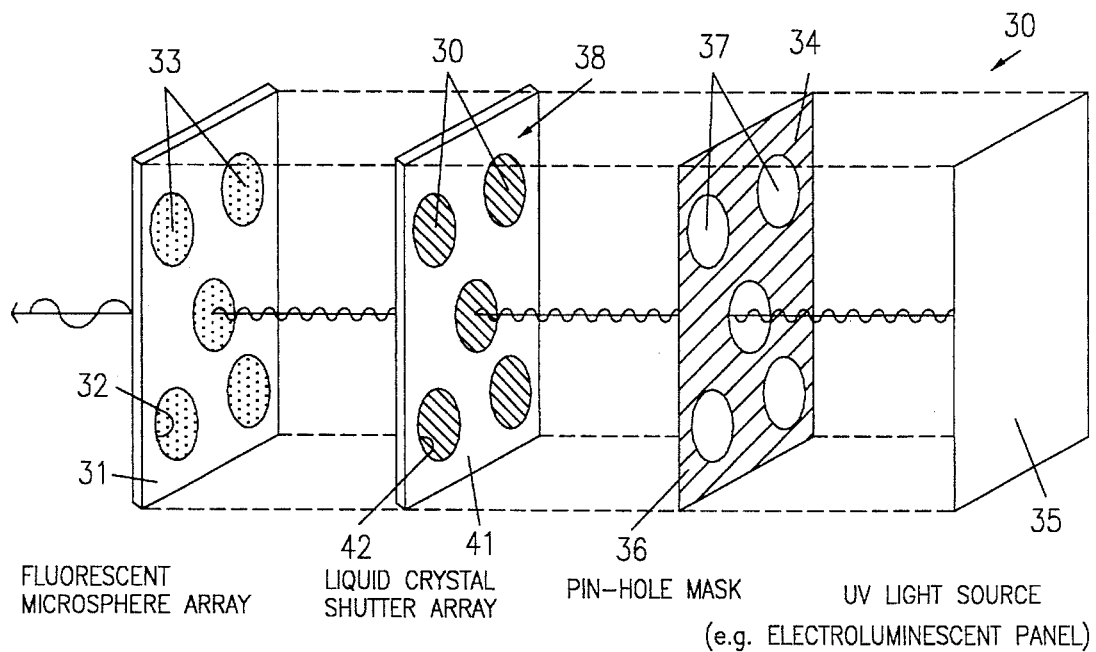
FIG. 7
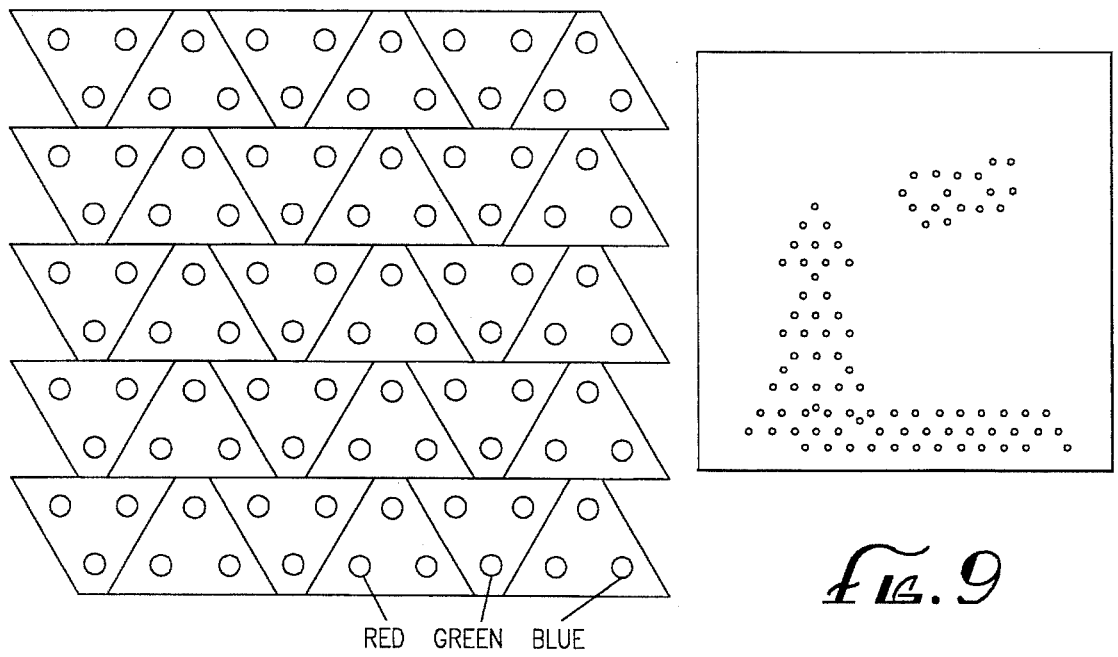
FIG. 8
FIG. 9

PROCESS FOR SYNTHESIZING AMORPHOUS SILICA MICROSPHERES WITH FLUORESCENCE BEHAVIOR

BACKGROUND OF THE INVENTION

The field of the invention is a process for synthesizing amorphous silica microspheres with fluorescence behavior and their applications.

U.S. Pat. No. 4,983,369 a process for producing highly uniform microspheres of silica having an average diameter of 0.1–10 microns from the hydrolysis of a silica precursor, such as tetraalkoxysilanes, which is characterized by employing precursor solutions and feed rates which initially yield a two-phase reaction mixture.

U.S. Pat. No. 4,943,425 teaches a method of making high purity, dense silica of large particles size. Tetraethylorthosilicate is mixed with ethanol and is added to a dilute acid solution having a pH of about 2.25. The resulting solution is digested for about 5 hours, then 2N ammonium hydroxide is added to form a gel at a pH of 8.5. The gel is screened through an 18–20 mesh screen, vacuum baked, calcined in an oxygen atmosphere and finally heated to about 1200 C. in air to form a large particle size, high purity, dense silica.

U.S. Pat. No. 4,965,091 teaches a sol-gel procedure is described for making display devices with luminescent films. The procedure typically involves hydrolysis and polymerization of an organometallic compound together with selected luminescent ions, and coating of a substrate and then heat treatment to form a polycrystalline layer.

U.S. Pat. No. 4,931,312 teaches luminescent thin films which are produced by a sol-gel process in which a gellable liquid is applied to a substrate to form a thin film, gelled and heated to remove volatile constituents and form a polycrystalline luminescent material.

U.S. Pat. No. 4,997,286 teaches an apparatus for measuring temperature in a region of high temperature which includes a sensor made from a fluorescent material, located within the region of high temperature. The fluorescent decay time of the fluorescent material is dependent upon the temperature of the fluorescent material.

U.S. Pat. No. 4,948,214 teaches an array of individual light emitters of a LED linear array each of which is imaged by a discrete step-index light guide and gradient index microlens device. The light guides consist of high refractive index cores, each surrounded by low refractive index matter. A multiplicity of light guides are deposited in channels formed in a host material, such as a silicon wafer. The host material between adjacent channels functions as an opaque separator to prevent cross-talk between adjacent light guides.

U.S. Pat. No. 4,925,275 teaches a liquid crystal color display which provides a transmitted light output that is of one or more colors, black, and/or white, as a function of the color of the incident light input and controlled energization or not of respective optically serially positioned liquid crystal color layers and/or multicolor composite liquid crystal color layer(s) in the display. In one case the display includes a plurality of liquid crystal color layers, each being dyed a different respective color, and apparatus for selectively applying a prescribed input, such as an electric field, to a respective layer or layers or to a portion or portions thereof. Each liquid crystal layer includes plural volumes of operationally nematic liquid crystal material in a containment medium that tends to distort the natural liquid crystal structure in the absence of a prescribed input, such as an electric field, and pleochroic dye is included or mixed with the liquid crystal material in each layer. Each layer is differently colored by the dye so as to have a particular coloring effect on light incident thereon. Exemplary layer colors may be yellow, cyan and magenta.

U.S. Pat. No. 4,957,349 teaches an active matrix screen for the color display of television images or pictures, control system which utilizes the electrically controlled birefringence effect and includes an assembly having a nematic liquid crystal layer with a positive optical anisotropy between an active matrix having transparent control electrodes and a transparent counter electrode equipped with colored filters and two polarizing means, which are complimentary of one another and are located on either side of the assembly.

U.S. Pat. No. 4,965,091 teaches a sol-gel procedure is described for making display devices with luminescent films. The procedure typically involves hydrolysis and polymerization of an organometallic compound together with selected luminescent ions, and coating of a substrate and then heat treatment to form a polycrystalline layer.

U.S. Pat. No. 4,948,843 teaches dye-containing polymers in which the dyes are organic in nature are incorporated into glasses produced by a sol-gel technique. The glasses may be inorganic or organic-modified metal oxide heteropolycondensates. The dye-containing polymers are covalently bonded to the glass through a linking group. The products of this invention can be used to make optically clear colored films which can be employed in the imaging, optical, solar heat energy and related arts.

SUMMARY OF INVENTION

The present invention is directed to a process for synthesizing amorphous silica microspheres including the steps of placing into a container an organosilicon precursor and with a highly acidic solution and rinsing with a solvent to remove excess of the organosilicon precursor from the amorphous silica microspheres.

In a first aspect of the invention the organosilicon precursor and the highly acidic solution are immiscible and the process for synthesizing amorphous silica microspheres also includes the step of stirring the organosilicon precursor and the highly acidic solution to form droplets of the organosilicon precursor in the highly acidic solution whereby water in the highly acidic solution hydrolizes the droplets of the organosilicon precursor to form amorphous silica microspheres.

In a second aspect of the invention the process for synthesizing amorphous silica microspheres further includes the step of rinsing with a solvent to remove excess of the organosilicon precursor from the amorphous silica microspheres.

In a third aspect of the invention the process for synthesizing amorphous silica microspheres with fluorescence behavior still further includes the step of adding a dopant which is from a group consisting of rhodamine-6G, rhodamine-B, europium $3^+$, fluorescein, coumarin-120, coumarin-314T, thionine, uranium and uranium-sensitized europium Other aspects and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

FIG. 2 is a graph of the diameter of the amorphous silica microspheres which have been synthesized by the process of FIG. 1.

FIG. 4 is a table which sets out the effect of liquid environment on the fluorescence behavior of the optically active silica-gel microsheres which have been synthesized by the process of FIG. 1.

FIG. 7 is an exploded perspective drawing of a display screen which includes a plate, an array of microspheres with fluorescence behavior, a liquid crystal shutter array, a pin hole mask and a ultraviolet light source according to the present invention.

FIG. 8 is a schematic drawing of the distribution of the microspheres with fluorescence behavior of FIG. 7 within in the array thereof.

FIG. 9 is a photograph of the display screen of FIG. 7.

DESCRIPTION OF THE PREFERRED EMBODIMENT

Figure 1:
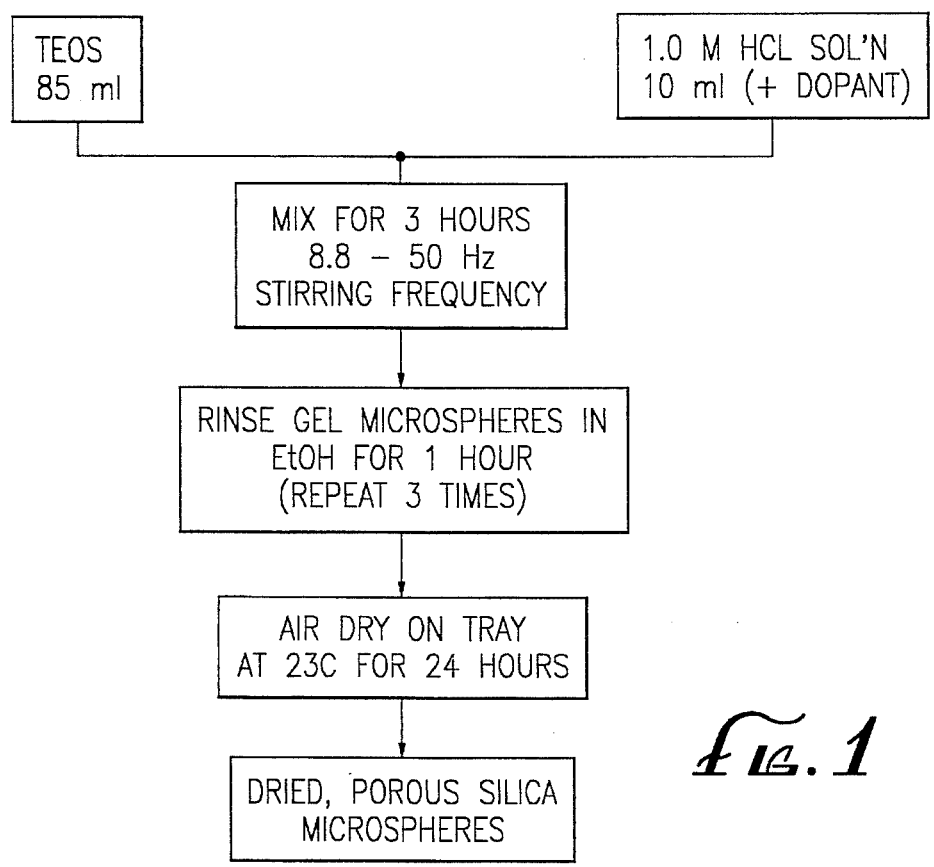
FIG. 1 is a schematic diagram of a process for synthesizing amorphous silica microspheres according to the present invention.

Referring to FIG. 1 in conjunction with FIG. 2 a process for synthesizing amorphous silica microsphere with fluorescence behavior includes the steps of placing into a container an organosilicon precursor and a highly acidic solution, adding a dopant and stirring the organosilicon precursor and the highly acidic solution at a stirring rate sufficient to form droplets of the organosilicon precursor in the highly acidic solution. Water in the highly acidic solution hydrolizes the droplets of the organosilicon precursor to form amorphous silica microspheres 10. The stirring rate is in the range between 8 Hz to 50 Hz. The highly acidic solution has a molar concentration in the range of 0.05 to 2.5. The organosilicon precursor and the highly acidic solution are immiscible. The volumetric ratio of the organosilicon precursor to the highly acidic solution is in the range from 8 to 1 to 18 to 1. The organosilicon precursor is selected from a group consisting of tetraethoxysilane (TEOS), tetrabutoxysilane (TBOS), tetramethoxysilane (TMOS) and tetrapropoxysilane (TPOS). The highly acidic solution is selected from a group consisting of nitric acid ($HNO_3$) and hydrochloric acid (HCl). The dopant is selected from a group consisting of rhodamine-6G, rhodamine-B, europium $3^+$, fluorescein, coumarin-120, coumarin-314T, thionine, uranium and uranium-sensitized europium. The logarithium-plot of the average diameter of the amorphous silica microsphere 10 versus the inverse stirring frequency is linear.

Figure 3:
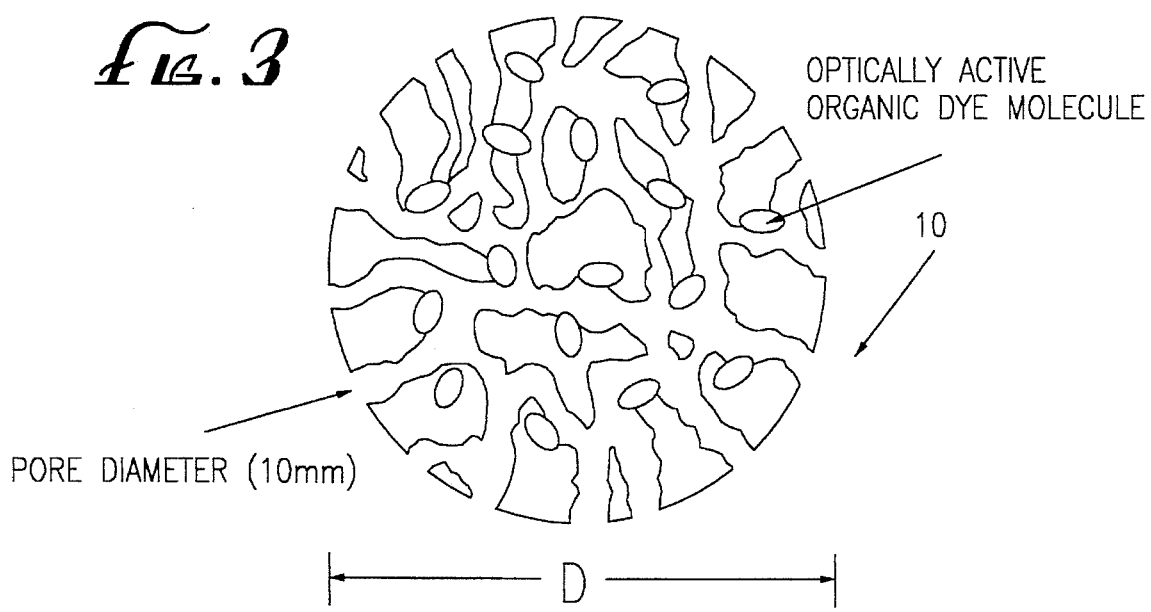
FIG. 3 is a cross-sectional of an amorphous silica microsphere which has been synthesized by the process of FIG. 1.

Referring to FIG. 1 in conjunction with FIG. 3 the process for synthesizing amorphous silica microsphere 10 with fluorescence behavior also includes the steps of rinsing with a solvant to remove excess of the organosilicon precursor from the amorphous silica microspheres and air drying the rinsed amorphous silica microspheres. The solvent may be, but is not limited to, either ethanol or methanol.

Referring to FIG. 4 a table sets out the effect of a liquid environment on the fluorescence behavior of the optically active silica-gel microspheres 10. This effect allows the optically active silica-gel microspheres 10 to be used as a biological sensing device. When the optically active silica-gel microspheres 10 are immersed in a biological fluid, a fluorescence spectrophotometer is able to measure a shift in the fluorescence peak wavelength.

A biological sensing system includes a container, a plurality of amorphous silica microspheres 10 with fluorescence behavior and a fluorescence spectrophotometer. The container contains a biological fluid to be tested for either the presence or the absence of an organism. The amorphous silica microspheres 10 with fluorescence behavior are placed in the container. A shift in the fluorescence peak wavelength of the dopant in the amorphous silica microspheres 10 occurs if the organism is present. The fluorescence spectrophotometer determine if the shift in the fluorescence peak wavelength of the dopant has occured.

Figure 5:
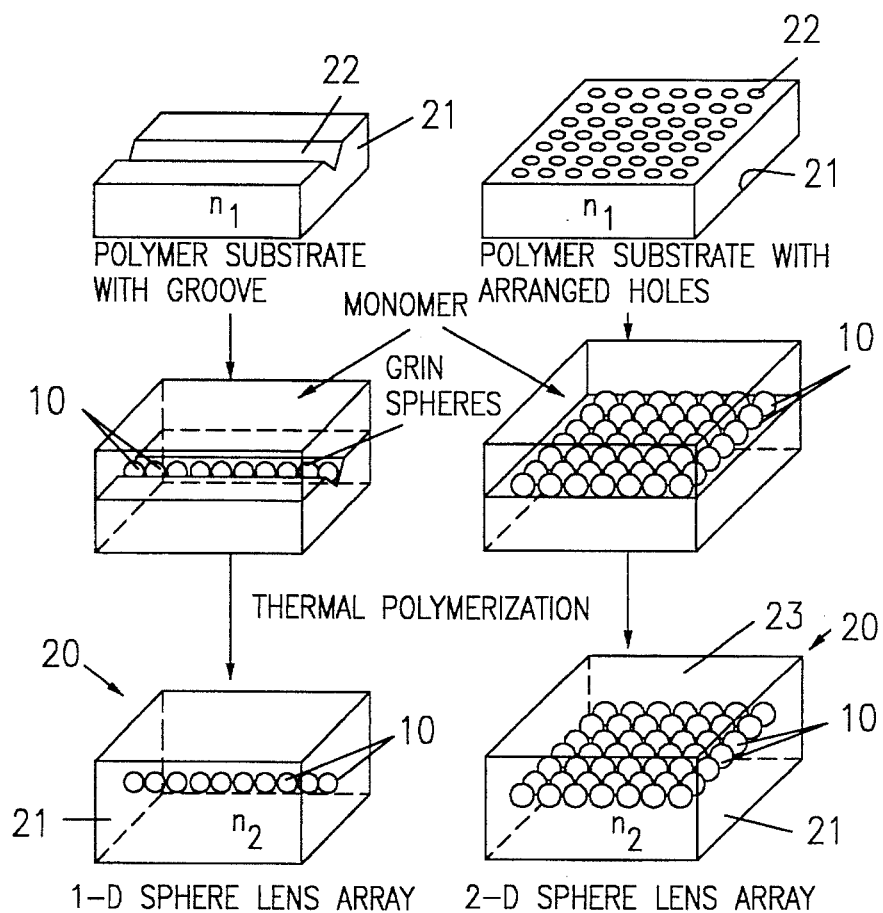
FIG. 5 is a schematic diagram of a process for fabricating a polished array of spherical microlenses according to the present invention.
Figure 6:
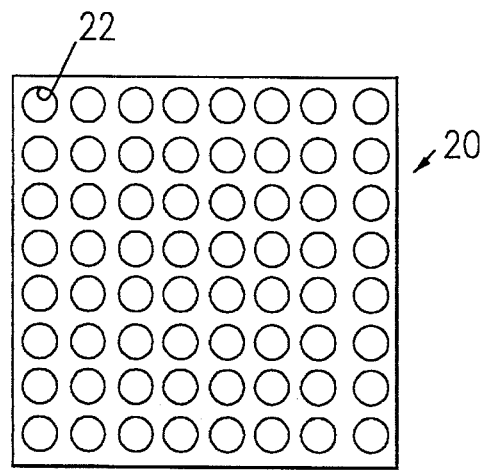
FIG. 6 is a photograph of the polished array of spherical microlenses which has been fabricated by the process for fabricating a polished array of spherical microlenses of FIG. 5.

Referring to FIG. 5 in conjunction with FIG. 6 a process for fabricating a polished array 20 of spherical microlenses includes the steps of forming a plurality of indentions 22 in a plate 21 of a polymer, filling each of the indentations 22 of the plate 21 with one of the amorphous silica microspheres 10.

The process for fabricating the polished array 20 of spherical microlenses also includes immersing the plate 21 into a liquid monomer 23, polymerizing the liquid monomer 23 to encapsulate the amorphous silica microspheres 10 in the plate 21 to form an unpolished array 20 of spherical microlenses and polishing the unpolished array of spherical microlenses. Either ultraviolet light or a catalyst at a curing temperature may be used to polymerize the liquid monomer 23.

A dopant may be selected from a group consisting of rhodamine-6G, rhodamine-B, europium $3^+$fluorescein, coumarin-120, coumarin-314T, thionine, uranium and uranium-sensitized europium in the process for synthesizing the amorphous silica microspheres 10.

Referring to FIG. 7 in conjunction with FIG. 8 and FIG. 9 a display screen 30 includes a plate 31 which has a plurality of holes 32 arranged in a matrix array, a plurality of microspheres 33, a pin-hole mask 34 and an ultraviolet light source 35. Each microspheres 33 has fluorescence behavior and is disposed in one of the holes 32 in the plate 31. The pin hole-mask 34 is an opaque sheet 36 with a plurality of pin-holes 37 each of which is optically aligned with one of the microspheres 33.

Still referring to FIG. 7 a liquid crystal shutter array 38 includes a plurality of light valves 39. Each light valve 39 is aligned with one of the holes 32 of the plate 31 and one of the pin-holes 37 of the pin-hole mask 34. Each light valve 39 is optically coupled to one of the microspheres 33. The ultraviolet light source 35 is optically coupled to the microspheres 33 through the light valves 38 and the pin-hole mask 34. The light valves 39 are disposed on an opaque plate 41 with an array of pin-holes 42. The presence or an absence of a light path from the ultraviolet light source 35 to any of the associated microspheres 33 determines whether or not it fluoresces. In a display unit which has display electronics each light valves 39 is mechanically coupled to a transparent plate and an opaque sheet with a matrix array of pinholes which are aliugned with the liquid crystal shutter array 38 being electrically coupled to the display electronics of the display unit.

Referring to FIG. 8 in conjunction with FIG. 9 a distribution of the microspheres with fluorescence behavior of different colors, such as red, blue and green, is used to provide a prototype of the display screen.

From the foregoing it can be seen that a process for synthesizing amorphous silica microspheres with fluorescence behavior and their applications have been described. It should be noted that the sketches are not drawn to scale and that distance of and between the figures are not to be considered significant. Accordingly it is intended that the foregoing disclosure and showing made in the drawing shall be considered only as an illustration of the principle of the present invention.

What is claimed is:

1. A process for synthesizing amorphous silica microspheres comprising the steps of:

a. placing into a container an organosilicon precursor wherein said organosilicon precursor is selected from a group consisting of tetraethoxysilane (TEOS), tetrabutoxysilane (TBOS), tetramethoxysilane (TMOS) and tetrapropoxysilane (TPOS), and an acidic solution having an acid molar concentration in the range of 0.05 to 2.5 wherein said acidic solution is selected from a group consisting of nitric acid ($HNO_3$) and hydrochloric acid (HCl) wherein said organosilicon precursor and said acidic solution are immiscible whereby a volumetric ratio of said organosilicon precursor to said acidic solution is in the range from 8 to 1 to 18 to 1;

b. stirring said organosilicon precursor and said acidic solution at a stirring rate in the range between 8 Hz to 50 Hz to form droplets of said organosilicon precursor in said acidic solution whereby water in said acidic solution hydrolizes said droplets of said organosilicon precursor to form amorphous silica microspheres; and c. rinsing with a solvent to remove excess of said organosilicon precursor from said amorphous silica microspheres.

2. A process for synthesizing amorphous silica microspheres according to claim 1 including the step of adding a dopant to said organosilicon precursor and said highly acidic solution in said container wherein said dopant is selected from a group consisting of rhodamine-6G, rhodamine-B, europium $3^+$, fluorescein, coumarin-120, coumarin-314T, thionine, uranium and uranium-sensitized europium whereby said amorphous silica microspheres have fluorescence behavior.

\* \* \* \* \*